(12) United States Patent  (10) Patent No.: US 8,711,664 B2
Juan et al.  (45) Date of Patent: Apr. 29, 2014

(54) METHOD OF CONTROLLING MECHANICAL MECHANISMS OF OPTICAL STORAGE APPARATUS FOR PEAK POWER/CURRENT REDUCTION, AND RELATED OPTICAL STORAGE APPARATUS AND MACHINE-READABLE MEDIUM

(75) Inventors: Kuan-Kai Juan, Hsinchu County (TW); Jia-Hau Lin, Tai-Chung Hsien (TW); Gwo-Huei Wu, Taipei Hsien (TW); Hung-Yen Chen, Taipei (TW); Chih-Chung Wu, Pingtung County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 294 days.

(21) Appl. No.: 12/986,194

(22) Filed: Jan. 7, 2011

(65) Prior Publication Data
US 2011/0314483 A1 Dec. 22, 2011

Related U.S. Application Data

(60) Provisional application No. 61/356,653, filed on Jun. 21, 2010.

(51) Int. Cl.
*G11B 7/085* (2006.01)
*G11B 7/09* (2006.01)
*G11B 19/20* (2006.01)

(52) U.S. Cl.
USPC ............... 369/44.27; 369/47.38; 369/53.3

(58) Field of Classification Search
USPC .......... 369/44.25–44.36, 47.36, 47.38, 47.39, 369/47.42, 47.44, 47.45–47.48, 53.2, 53.22, 369/53.23, 53.3, 53.37, 124.01, 124.02, 369/124.1–124.14
See application file for complete search history.

(56) References Cited

U.S. PATENT DOCUMENTS

| | | | | |
|---|---|---|---|---|
| 5,020,045 A | * | 5/1991 | Smart et al. | 369/44.29 |
| 5,121,370 A | * | 6/1992 | Yanagi | 369/30.15 |
| 6,072,757 A | * | 6/2000 | Tajiri | 369/53.2 |
| 7,376,063 B2 | | 5/2008 | Cheng | |
| 7,688,692 B2 | | 3/2010 | Chen | |
| 7,733,745 B2 | | 6/2010 | Langenhuizen | |
| 7,821,890 B2 | | 10/2010 | Liu | |
| 2003/0072225 A1 | * | 4/2003 | Tada | 369/44.29 |
| 2004/0228249 A1 | | 11/2004 | Goto | |
| 2004/0246859 A1 | | 12/2004 | Sonu | |
| 2005/0088931 A1 | * | 4/2005 | Takeuchi et al. | 369/44.29 |

(Continued)

FOREIGN PATENT DOCUMENTS

| | | |
|---|---|---|
| CN | 1652220 A | 8/2005 |
| CN | 1934628 A | 3/2007 |

(Continued)

*Primary Examiner* — Nathan Danielsen
(74) *Attorney, Agent, or Firm* — Winston Hsu; Scott Margo (57) ABSTRACT

An exemplary method of controlling an optical storage apparatus includes: driving a first mechanical mechanism of the optical storage apparatus by applying a first control signal to the first mechanical mechanism, wherein a second mechanical mechanism of the optical storage apparatus is inactive while the first mechanical mechanism is operating in response to the first control signal; adjusting the first control signal applied to the first mechanical mechanism when the second mechanical mechanism is requested to be active; and driving the second mechanical mechanism by applying a second control signal to the second mechanical mechanism while the first mechanical mechanism is operating in response to the adjusted first control signal.

34 Claims, 10 Drawing Sheets

(56) References Cited

U.S. PATENT DOCUMENTS

| | | | |
|---|---|---|---|
| 2007/0121439 A1* | 5/2007 | Dekker | 369/44.28 |
| 2007/0206466 A1 | 9/2007 | Van Endert | |
| 2008/0101173 A1* | 5/2008 | Langenhuizen | 369/44.28 |
| 2009/0154312 A1 | 6/2009 | Takarabe | |

FOREIGN PATENT DOCUMENTS

| | | |
|---|---|---|
| CN | 101169951 A | 4/2008 |
| TW | I253633 | 4/2006 |
| TW | I292905 | 1/2008 |
| TW | I323453 | 4/2010 |

* cited by examiner

METHOD OF CONTROLLING MECHANICAL MECHANISMS OF OPTICAL STORAGE APPARATUS FOR PEAK POWER/CURRENT REDUCTION, AND RELATED OPTICAL STORAGE APPARATUS AND MACHINE-READABLE MEDIUM

CROSS REFERENCE TO RELATED APPLICATIONS

This application claims the benefit of U.S. provisional application No. 61/356,653, filed on Jun. 21, 2010 and incorporated herein by reference.

BACKGROUND

The disclosed embodiments of the present invention relate to controlling an optical storage apparatus, and more particularly, to a method of controlling mechanical mechanisms of an optical storage apparatus (e.g., an external optical disc drive) for peak power/current reduction, and related optical storage apparatus and machine-readable medium.

Optical storage apparatuses, such as optical disc drives, become popular due to optical storage media with low cost and high storage capacity. For example, optical disc drives are commonly used in the computer systems. In general, an optical disc drive has a plurality of mechanical mechanisms employed for rotating a loaded optical disc, moving a sled on which an optical pick-up unit (OPU) is disposed, controlling tracking and focusing of a laser spot irradiated by the OPU on the loaded optical disc, etc. However, when multiple mechanical mechanisms are all active at the same time, the power/current consumption is inevitably high. In a worst case, the peak power/current consumption may exceed the maximum level that the power source of the optical disc drive can afford. It is possible that the optical disc drive may fail to work normally when the power/current consumption of the optical disc drive is not well controlled.

Thus, there is a need for an innovative design which can effectively reduce the power/current consumption of an optical storage apparatus.

SUMMARY

In accordance with exemplary embodiments of the present invention, a method of controlling mechanical mechanisms of an optical storage apparatus (e.g., an external optical disc drive) for peak power/current reduction, and related optical storage apparatus and machine-readable medium are proposed to solve the above-mentioned problems.

According to a first aspect of the present invention, an exemplary method of controlling an optical storage apparatus is disclosed. The optical storage apparatus has a plurality of mechanical mechanisms including at least a first mechanical mechanism and a second mechanical mechanism. The exemplary method includes: driving the first mechanical mechanism by applying a first control signal to the first mechanical mechanism, wherein the second mechanical mechanism is inactive while the first mechanical mechanism is operating in response to the first control signal; adjusting the first control signal applied to the first mechanical mechanism when the second mechanical mechanism is requested to be active; and driving the second mechanical mechanism by applying a second control signal to the second mechanical mechanism while the first mechanical mechanism is operating in response to the adjusted first control signal.

According to a second aspect of the present invention, an exemplary optical storage apparatus is disclosed. The exemplary optical storage apparatus has a plurality of mechanical mechanisms including at least a first mechanical mechanism and a second mechanical mechanism, and a control module including a first controller and a second controller. The first controller is arranged for driving the first mechanical mechanism by applying a first control signal to the first mechanical mechanism, wherein the second mechanical mechanism is inactive while the first mechanical mechanism is operating in response to the first control signal; and is also arranged for adjusting the first control signal applied to the first mechanical mechanism when the second mechanical mechanism is requested to be active. The second controller is arranged for driving the second mechanical mechanism by applying a second control signal to the second mechanical mechanism while the first mechanical mechanism is operating in response to the adjusted first control signal.

According to a third aspect of the present invention, an exemplary machine-readable medium is disclosed. The exemplary machine-readable medium stores a program code, when executed by a processor, causing the processor to perform following steps: driving a first mechanical mechanism of an optical storage apparatus by applying a first control signal to the first mechanical mechanism, wherein a second mechanical mechanism of the optical storage apparatus is inactive while the first mechanical mechanism is operating in response to the first control signal; adjusting the first control signal applied to the first mechanical mechanism when the second mechanical mechanism is requested to be active; and driving the second mechanical mechanism by applying a second control signal to the second mechanical mechanism while the first mechanical mechanism is operating in response to the adjusted first control signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "electrically connected" is intended to mean either an indirect or direct electrical connection. Accordingly, if one device is electrically connected to another device, that connection may be through a direct electrical connection, or through an indirect electrical connection via other devices and connections.

The conception of the present invention is to properly control the mechanical mechanisms to prevent the peak power/current consumption from exceeding a permitted level when more than one active mechanical mechanism of an optical storage apparatus is involved in accomplishing a particular task. By way of example, but not limitation, the optical storage apparatus reduces the peak power/current at the expense of the performance of the optical storage apparatus. However, in most cases, the performance degradation of the optical storage apparatus is not perceivable to users. Technical features of the present invention are detailed as follows.

Figure 1:
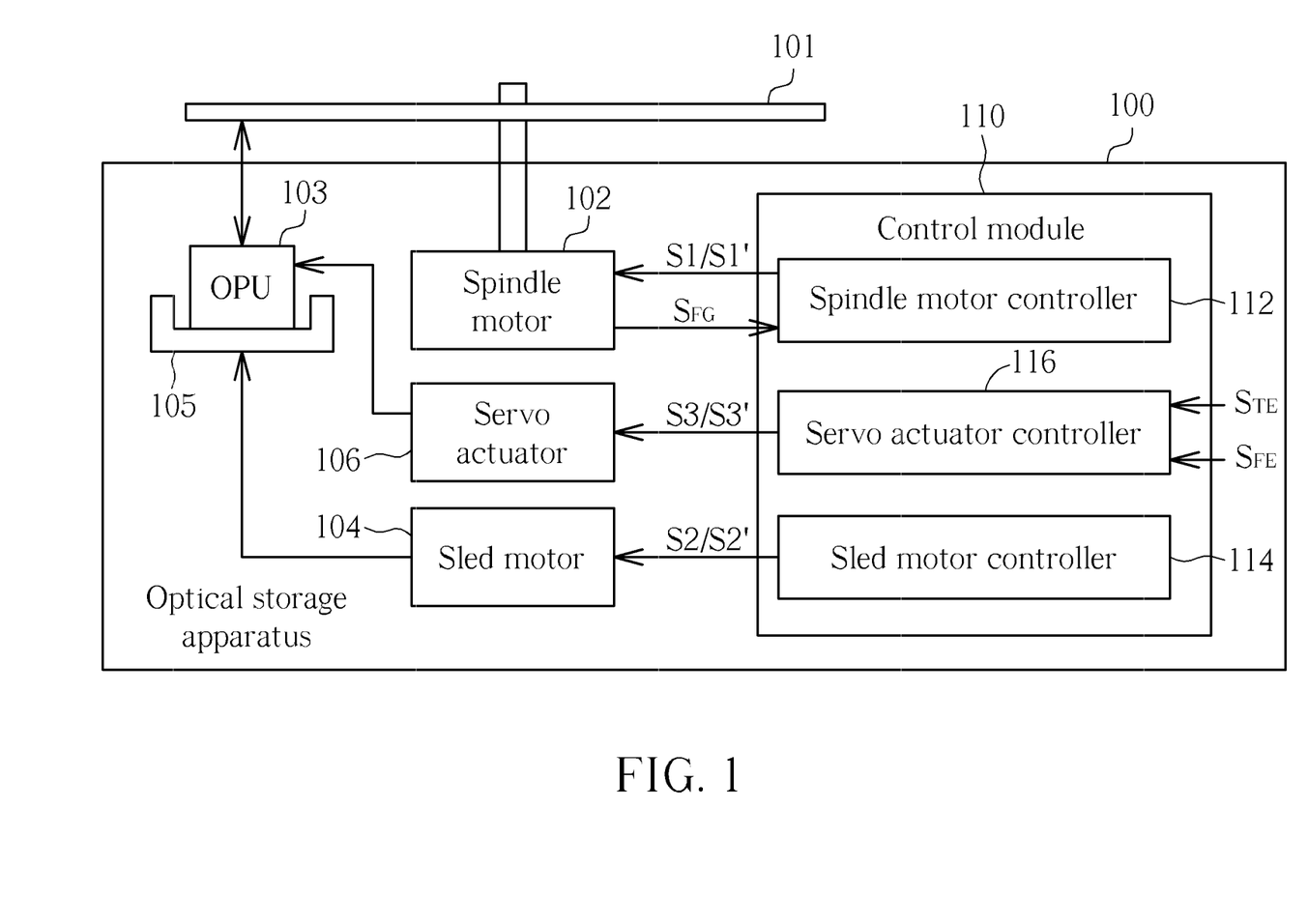
FIG. 1 is a diagram illustrating an optical storage apparatus according to an exemplary embodiment of the present invention.

FIG. 1 is a diagram illustrating an optical storage apparatus according to an exemplary embodiment of the present invention. The exemplary optical storage apparatus 100 includes, but is not limited to, a plurality of mechanical mechanisms (e.g., a spindle motor 102, a sled motor 104, and a servo actuator 106) and a control module 110 having a plurality of controllers (e.g., a spindle motor controller 112, a sled motor controller 114, and a servo actuator controller 116. The spindle motor 102 is electrically connected to the spindle motor controller 112, and controlled by the spindle motor controller 112 for rotating an optical storage medium (e.g., an optical disc) 101 at a desired rotational speed. The sled motor 104 is electrically connected to the sled motor controller 114, and controlled by the sled motor controller 114 for moving a sled 105 on which an optical pick-up unit (OPU) 103 is disposed in a radial direction of the optical storage medium 101. The servo actuator 106 is electrically connected to the servo actuator controller 116, and controlled by the servo actuator controller 116 for moving an objective lens of the OPU 103 to thereby make a laser spot focused on a desired recording layer of the optical storage medium 101 and/or locked to a desired track on the desired recording layer.

As a person skilled in the pertinent art can readily understand operations and functions of the spindle motor 102, the sled motor 104, and the servo actuator 106, further description is omitted here for brevity. It should be noted that only the components pertinent to the present invention are shown in FIG. 1. That is, the exemplary optical storage apparatus 100 may contain additional elements for other functions. For example, the optical storage apparatus 100 may also include a signal synthesizing circuit (not shown) employed for generating a tracking error signal $S_{TE}$ and a focus error signal $S_{FE}$ according to signals reflected from the optical storage medium 101, and a decoding circuit (not shown) employed for deriving information from a radio frequency (RF) signal obtained from reading the optical storage medium 101.

In this exemplary embodiment, the optical storage apparatus 100 may be an external optical disc drive which draws the needed supply power from a computer host to which the external optical disc drive is connected. Thus, the current/power consumption of the optical storage apparatus 100 should be well controlled to avoid violating the power supply capability of the interface (e.g., a universal serial bus (USB)) between the external optical disc drive and the computer host.

For example, one USB port is allowed to supply a current with 0.5 A at most. The present invention therefore proposes a method of controlling the optical storage apparatus 100 for peak power/current reduction, and may be briefly summarized by following steps: driving a first mechanical mechanism (e.g., one of the spindle motor 102, the sled motor 104, and the servo actuator 106) by applying a first control signal (e.g., one of the control signals S1, S2, and S3) to the first mechanical mechanism, wherein a second mechanical mechanism (e.g., another of the spindle motor 102, the sled motor 104, and the servo actuator 106) is inactive while the first mechanical mechanism is operating in response to the first control signal; adjusting the first control signal applied to the first mechanical mechanism when the second mechanical mechanism is requested to be active; and driving the second mechanical mechanism by applying a second control signal (e.g., another of the control signals S1, S2, and S3) to the second mechanical mechanism while the first mechanical mechanism is operating in response to the adjusted first control signal (e.g., one of the adjusted control signal S1', S2', and S3').

In one exemplary implementation, adjusting the first control signal applied to the first mechanical mechanism is accomplished by reducing the first control signal and accordingly generating the adjusted first control signal to the first mechanical mechanism. In another exemplary implementation, adjusting the first control signal applied to the first mechanical mechanism is accomplished by setting the adjusted first control through stopping the first control signal from being applied to the first mechanical mechanism. For example, the adjusted first control signal is kept at a predetermined voltage level or control level (e.g., "0"), thereby having no control over the first mechanical mechanism. Since the adjusted first control signal is smaller than the original first control signal, the current/power consumption of the first mechanical mechanism operating in response to the adjusted first control signal can be effectively reduced. Though the second mechanical mechanism becomes active while the first mechanical mechanism is operating in response to the adjusted first control signal, the overall current/power consumption of the first mechanical mechanism and the second mechanical mechanism is not beyond the acceptable level. Several operational scenarios of the optical storage apparatus 100 are discussed as below.

Regarding a first operational scenario, the above-mentioned first mechanical mechanism is the spindle motor 102, and the above-mentioned second mechanical mechanism is the sled motor 104. When the spindle motor 102 accelerates/decelerates its spindle rotation, the spindle motor 102 will consume much current. Similarly, when the sled motor 104 is moving the sled 105, the sled motor 104 will consume much current. If both of the spindle motor 102 and the sled motor 104 are active at the same time, the peak current/power consumption may be too high. To solve this problem, the control signal S1 which drives the spindle motor 102 to accelerate/decelerate its spindle rotation would be adjusted by the spindle motor controller 112 when the sled motor 104 is requested to be active for moving the sled 105. Please note that the adjusted control signal S1' may be set by reducing the control signal S1 applied to the spindle motor 102 such that the spindle motor 102 makes its spindle rotate with slower acceleration/deceleration, or may be set by stopping the control signal S1 from being applied to the spindle motor 102 such that the adjusted control signal S1' has no control over the spindle motor 102.

It should be noted that the three controllers (spindle motor controller 112, servo actuator controller 116, and sled motor controller 114) can be combined in a single controller in some embodiments (not shown), and the corresponding control signals still respectively control each one of the spindle motor 102, servo actuator 106, and sled motor 104.

Figure 2:
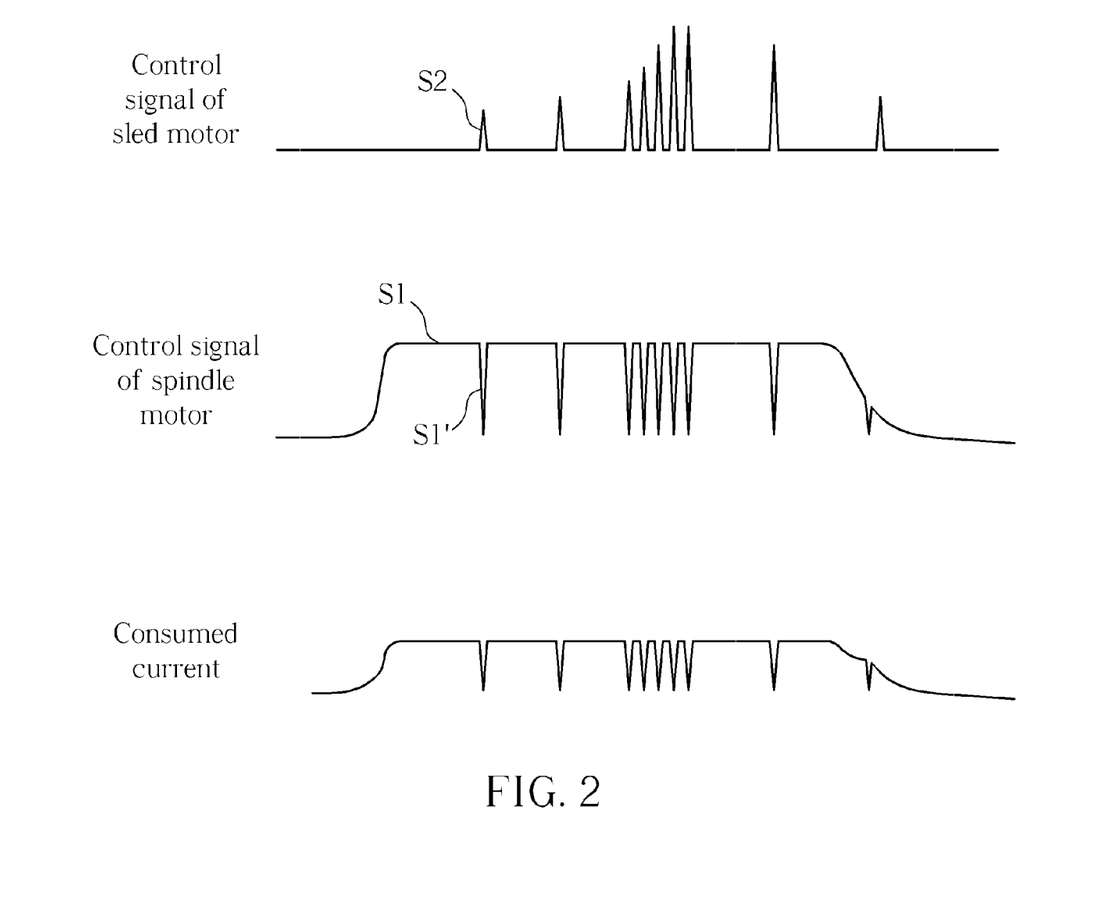
FIG. 2 is a diagram illustrating the relation among control signals of the spindle motor and sled motor and the overall current consumed by the optical storage apparatus.

Please refer to FIG. 2, which is a diagram illustrating the relation among control signals of the spindle motor 102 and sled motor 104 and the overall current consumed by the optical storage apparatus 100. As can be seen from FIG. 2, the control signal S1 which drives the spindle motor 102 to accelerate/decelerate its spindle rotation is reduced/stopped each time the control signal S2 enables the sled motor 104. Thus, the current consumption is reduced each time the control signal S2 enables the sled motor 104. Though the spindle acceleration/deceleration time may be slightly prolonged due to the adjustment made to the control signal S1, it is ensured that the peak current/power consumption does not exceed the acceptable level.

Figure 3:
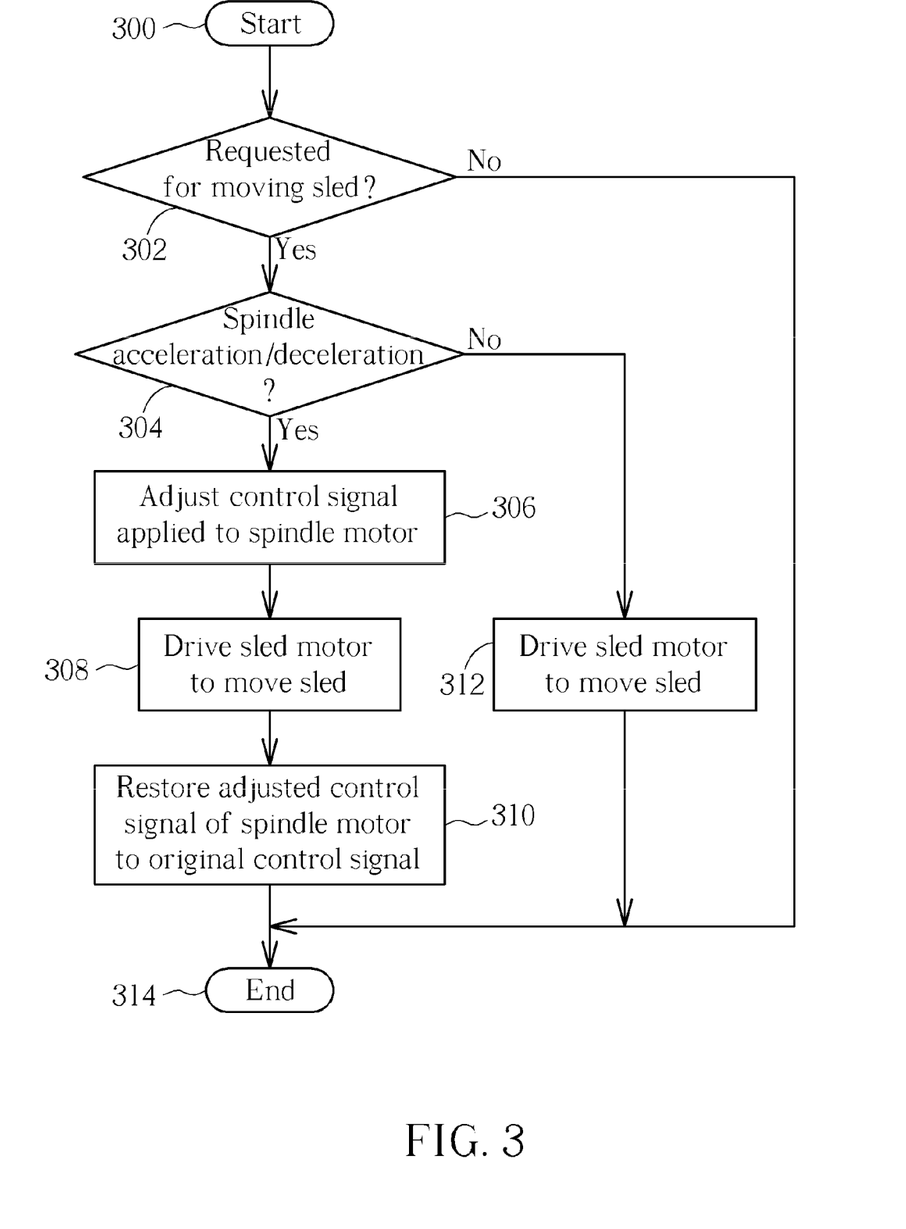
FIG. 3 is a flowchart illustrating an exemplary method of controlling the optical storage apparatus under a first operational scenario.

FIG. 3 is a flowchart illustrating an exemplary method of controlling the optical storage apparatus 100 under the first operational scenario. Provided that the result is substantially the same, the steps are not required to be executed in the exact order shown in FIG. 3. The exemplary method includes the following steps.

Step 300: Start.

Step 302: Check if the sled motor 104 is requested for moving the sled 105. If yes, go to step 304; otherwise, go to step 314.

Step 304: Check if the spindle motor 102 is accelerating/decelerating its spindle rotation. If yes, go to step 306; otherwise, go to step 312.

Step 306: Adjust the control signal S1 applied to the spindle motor 102.

Step 308: Drive the sled motor 104 to move the sled 105 by applying a control signal S2 to the sled motor 104.

Step 310: Restore the adjusted control signal S1' to the original control signal S1. Go to step 314.

Step 312: Drive the sled motor 104 to move the sled 105 by applying a control signal S2 to the sled motor 104.

Step 314: End.

In step 304, a frequency generator (FG) signal $S_{FG}$ generated from the spindle motor 102 may be used to monitor the rotational speed of the spindle. More specifically, the frequency of the FG signal $S_{FG}$ is proportional to the rotational speed of the spindle. Thus, when the frequency error (frequency variation) of the FG signal $S_{FG}$ is found greater than a predetermined threshold value, it is determined that the spindle motor 102 is accelerating/decelerating its spindle rotation.

Figure 4:
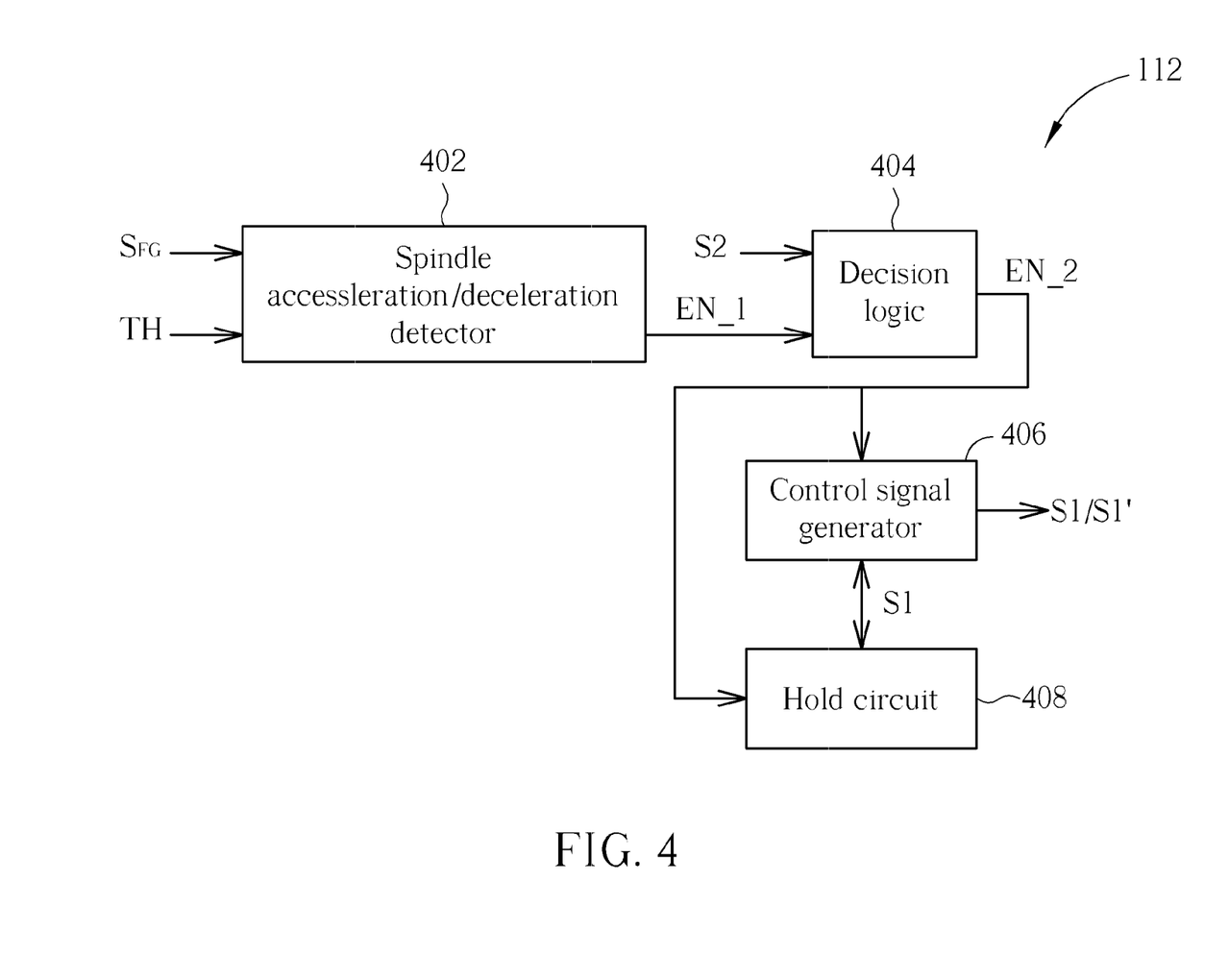
FIG. 4 is a block diagram illustrating an exemplary implementation of the spindle motor controller shown in FIG. 1.

Please refer to FIG. 4, which is a block diagram illustrating an exemplary implementation of the spindle motor controller 112 shown in FIG. 1. The spindle motor controller 112 includes a spindle acceleration/deceleration detector 402, a decision logic 404, a control signal generator 406, and a hold circuit 408. The spindle acceleration/deceleration detector 402 estimates the frequency error (frequency variation) of the FG signal $S_{FG}$, and generates an indication signal EN_1 with a specific voltage level or control level only when the frequency error (frequency variation) of the FG signal $S_{FG}$ is found greater than the predetermined threshold value TH. The decision logic 404 generates an indication signal EN_2 with a specific voltage level or control level only when receiving the indication signal EN_1 indicative of the spindle acceleration/deceleration and the control signal S2 indicative of the activation of the sled motor 104 (steps 302 and 304). When the decision logic 404 outputs the indication signal EN_2 to inform the event of concurrent spindle acceleration/deceleration and sled movement, the control signal generator 406 adjusts the control signal S1 to make the spindle motor 102 operate in response to the adjusted control signal S1', and the hold circuit 408 holds the control signal S1 (Step 306). Next, after the sled 105 is successfully moved by the sled motor 104, the control signal generator 406 restores the adjusted control signal S1' to the control signal S1 held by the hold circuit 408 (step 310). It should be noted that, when the decision logic 404 does not receive the control signal S2 indicating that the sled motor 104 is requested to be active or the indication signal EN_1 indicating that the spindle motor 102 is accelerating/decelerating its spindle rotation, the control signal generator 406 keeps outputting the control signal S1 (step 302/304).

Regarding a second operational scenario, the above-mentioned first mechanical mechanism is the spindle motor 102/sled motor 104, and the above-mentioned second mechanical mechanism is the servo actuator 106. Before a track-on process is performed, a track-seeking process may be performed to move the OPU 103 from a current track to a target track. Thus, the spindle motor 102 and the sled motor 104 may be involved in seeking the target track on the optical storage medium 101. If the spindle motor 102/sled motor 104 and the servo actuator 106 are all active at the same time when the track-on process is enabled for locking the laser spot to the target track, the peak current/power consumption may be too high. To solve this problem, when the servo actuator controller 116 is requested to be active during a track-on process for moving the objective lens of the OPU 103 in response to the servo control signal (e.g., the tracking error signal $S_{TE}$ and/or the focus error signal $S_{FE}$), the control signal S1 which drives the spindle motor 102 to accelerate/decelerate its spindle rotation would be adjusted by the spindle motor controller 112 and/or the control signal S2 which drives the sled motor 104 to move the sled 105 would be adjusted by the sled motor controller 114. Please note that the adjusted control signal S1' may be set by reducing the control signal S1 applied to the spindle motor 102 such that the spindle motor 102 makes its spindle rotate with slower acceleration/deceleration, or me by set by stopping the control signal S1 from being applied to the spindle motor 102 such that the adjusted control signal S1' has no control over the spindle motor 102. Regarding the adjusted control signal S2', it may be set by stopping the control signal S2 from being applied to the sled motor 104 such that the adjusted control signal S2' has no control over the sled motor 104.

Figure 5:
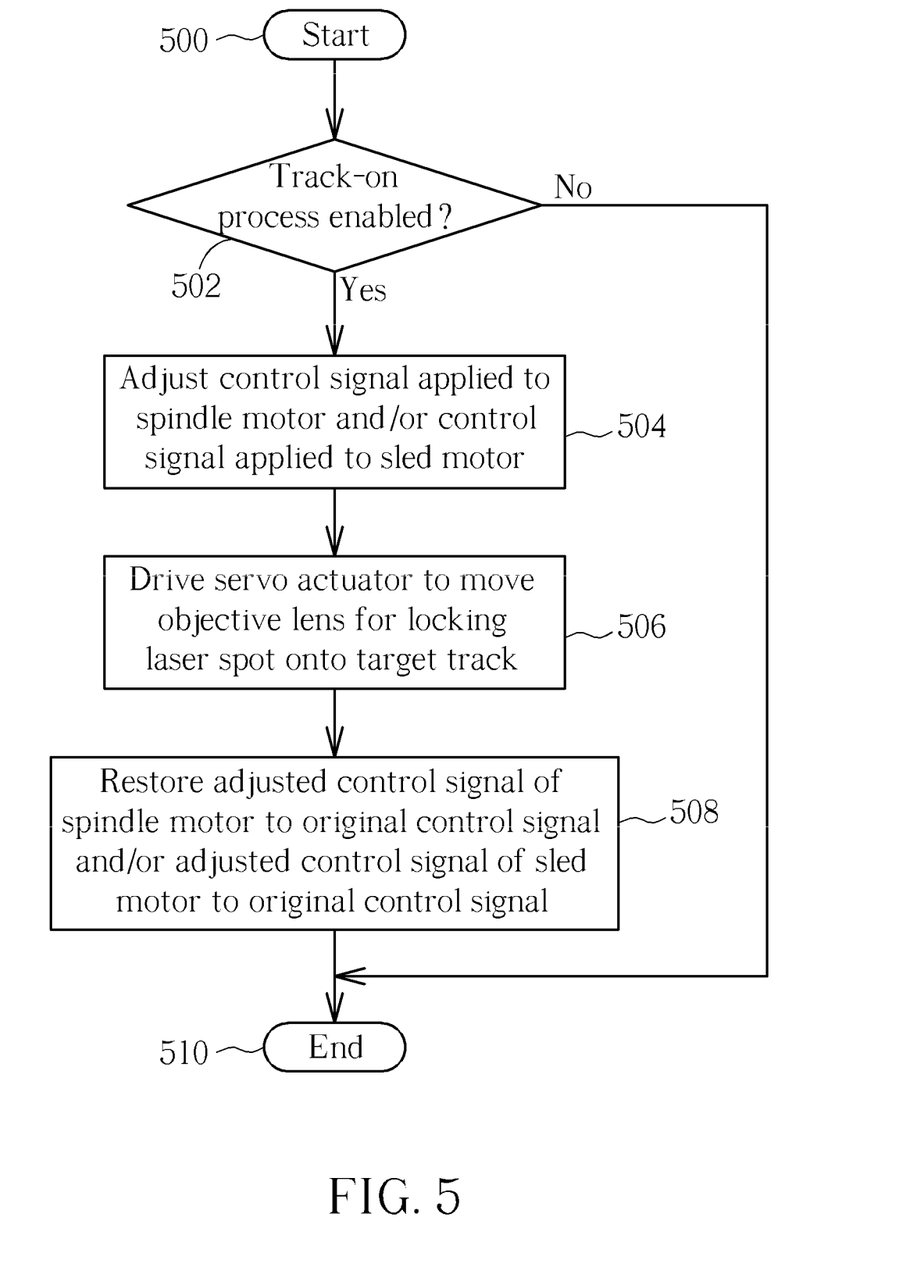
FIG. 5 is a flowchart illustrating an exemplary method of controlling the optical storage apparatus under a second operational scenario.

FIG. 5 is a flowchart illustrating an exemplary method of controlling the optical storage apparatus 100 under the second operational scenario. Provided that the result is substantially the same, the steps are not required to be executed in the exact order shown in FIG. 5. The exemplary method includes the following steps.

Step 500: Start.

Step 502: Check if a track-on process is enabled? If yes, go to step 504; otherwise, go to step 510.

Step 504: Adjust the control signal S1 applied to the spindle motor 102 and/or the control signal S2 applied to the sled motor 104.

Step 506: Drive the servo actuator 106 to move the objective lens of the OPU 103 by applying a control signal S3 to the servo actuator 106, thereby locking the laser spot to the target track.

Step 508: Restore the adjusted control signal S1' to the original control signal S1 and/or the adjusted control signal S2' to the original control signal S2.

Step 510: End.

It should be noted that the spindle motor controller 112/sled motor controller 114 may has a hold circuit (e.g., the hold circuit 408 shown in FIG. 4) for holding the original control signal when the track-on process is enabled (step 504), and then restores the adjusted control signal to the original control signal after the servo actuator controller 116 completes driving the servo actuator 106 to move the objective lens of the OPU 103 (step 508).

Regarding a third operational scenario, the above-mentioned first mechanical mechanism is the spindle motor 102/servo actuator 106, and the above-mentioned second mechanical mechanism is the sled motor 104. After the laser spot is locked onto the target track of the target recording layer, a track-following process is enabled to control the OPU 103 to thereby make the laser spot move along the spiral track for data reading/recording. Thus, the spindle motor 102 and the servo actuator 106 may be both involved in moving the laser spot along the spiral track. If the sled motor 104 is requested to move the sled 105 during the track-following process, the spindle motor 102/sled motor 104 and the servo actuator 106 are all active at the same time, resulting in high current/power consumption which may exceed the acceptable level. To solve this problem, when the sled motor 104 is requested to be active during a track-following process for moving the sled 105 in response to the control signal S2, the control signal S1 which drives the spindle motor 102 to accelerate/decelerate its spindle rotation would be adjusted by the spindle motor controller 112 and/or the control signal S3 which drives the servo actuator 106 to move the objective lens in the OPU 103 would be adjusted by the servo actuator controller 116. Please note that the adjusted control signal S1' may be set by reducing the control signal S1 applied to the spindle motor 102 or stopping the control signal S1 from being applied to the spindle motor 102. Regarding the adjusted control signal S3', it may be set by lowering an output gain applied to the servo control signal, including the tracking error signal $S_{TE}$ and/or the focus error signal $S_{FE}$.

Figure 6:
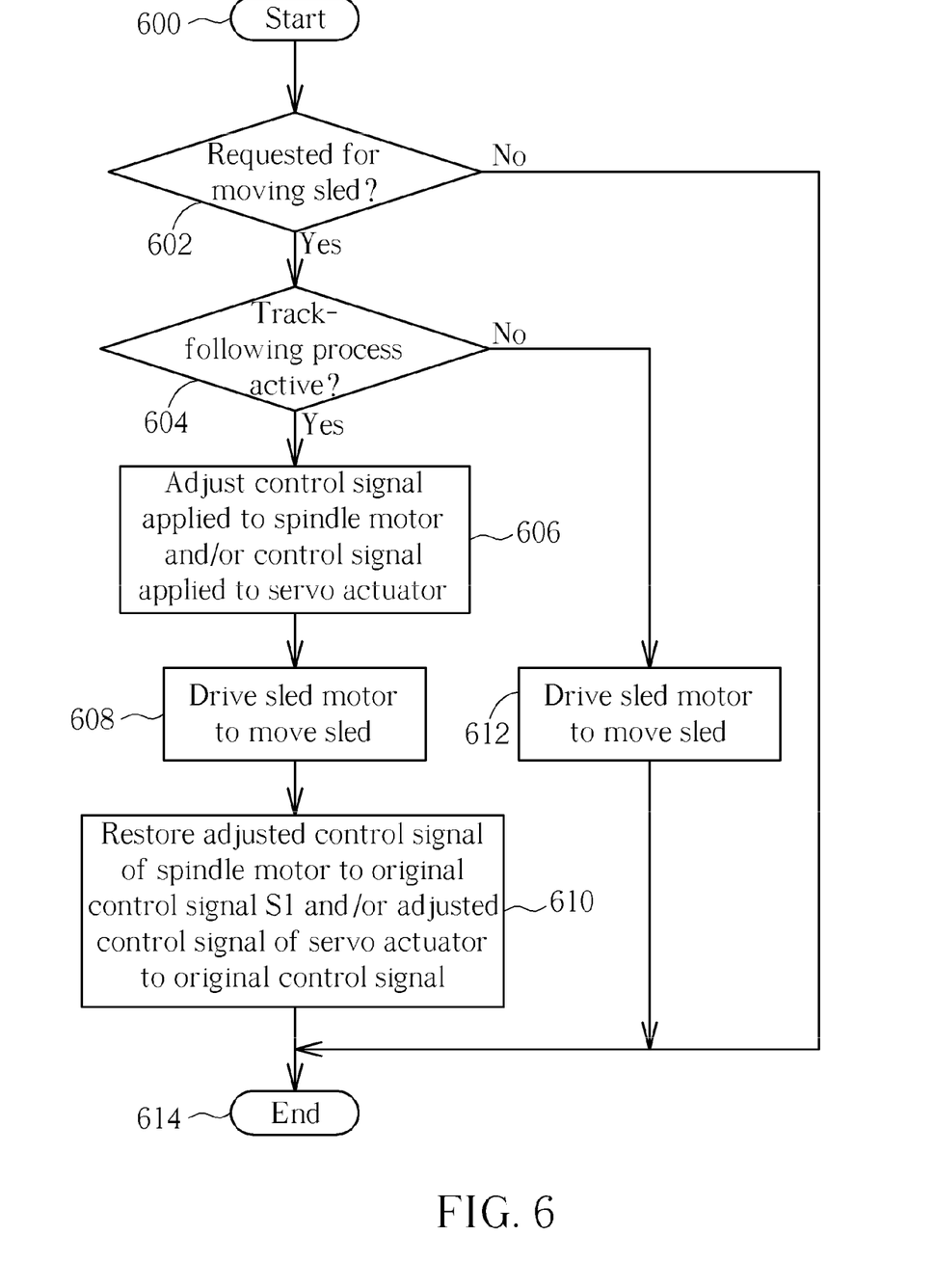
FIG. 6 is a flowchart illustrating an exemplary method of controlling the optical storage apparatus under a third operational scenario.

FIG. 6 is a flowchart illustrating an exemplary method of controlling the optical storage apparatus 100 under the third operational scenario. Provided that the result is substantially the same, the steps are not required to be executed in the exact order shown in FIG. 6. The exemplary method includes following steps.

Step 600: Start.

Step 602: Check if the sled motor 104 is requested for moving the sled 105. If yes, go to step 604; otherwise, go to step 614.

Step 604: Check if the track-following process is active now. If yes, go to step 606; otherwise, go to step 612.

Step 606: Adjust the control signal S1 applied to the spindle motor 102 and/or the control signal S3 applied to the servo actuator 106.

Step 608: Drive the sled motor 104 to move the sled 105 by applying a control signal S2 to the sled motor 104.

Step 610: Restore the adjusted control signal S1' to the original control signal S1 and/or the adjusted control signal S3' to the original control signal S3. Go to step 614.

Step 612: Drive the sled motor 104 to move the sled 105 by applying a control signal S2 to the sled motor 104.

Step 614: End.

It should be noted that the spindle motor controller 112/servo actuator controller 116 may has a hold circuit (e.g., the hold circuit 408 shown in FIG. 4) for holding the original control signal (step 606), and then restores the adjusted control signal to the original control signal after the sled motor controller 114 completes driving the sled motor 104 to move the sled 105 (step 610).

Regarding a fourth operational scenario, the above-mentioned first mechanical mechanism is the sled motor 104, and the above-mentioned second mechanical mechanism is the spindle motor 102 arranged to operate under a constant linear velocity (CLV) mode, such as a zoned-CLV (Z-CLV) mode. When a track-seeking process is performed for making the OPU 103 jump to a target track, the spindle motor 102 may be required to change its rotational speed and/or the sled motor 104 may be required to move the sled 105, depending upon the distance between the current track and the target track. If the spindle motor 102 and the sled motor 104 are both active at the same time during the track-seeking process, the current/power consumption may be too high. To solve this problem, the sled motor 104 is enabled for moving the sled 105 for carrying the OPU 103 to the target track before the spindle motor 102 changes the rotational speed of the optical storage medium 101 by accelerating/decelerating its spindle rotation. In other words, when the spindle motor 102 is required to change the rotational speed of the optical storage medium 101 in response to the control signal S1, the control signal S2 which drives the sled motor 104 would be adjusted by the sled motor controller 114. For example, after the OPU 103 is moved to the target track, the sled motor controller 114 adjusts the control signal S2 by stopping the control signal S2 from being applied to the sled motor 104 such that the adjusted control signal S2' has no control over the sled motor 104.

Figure 7:
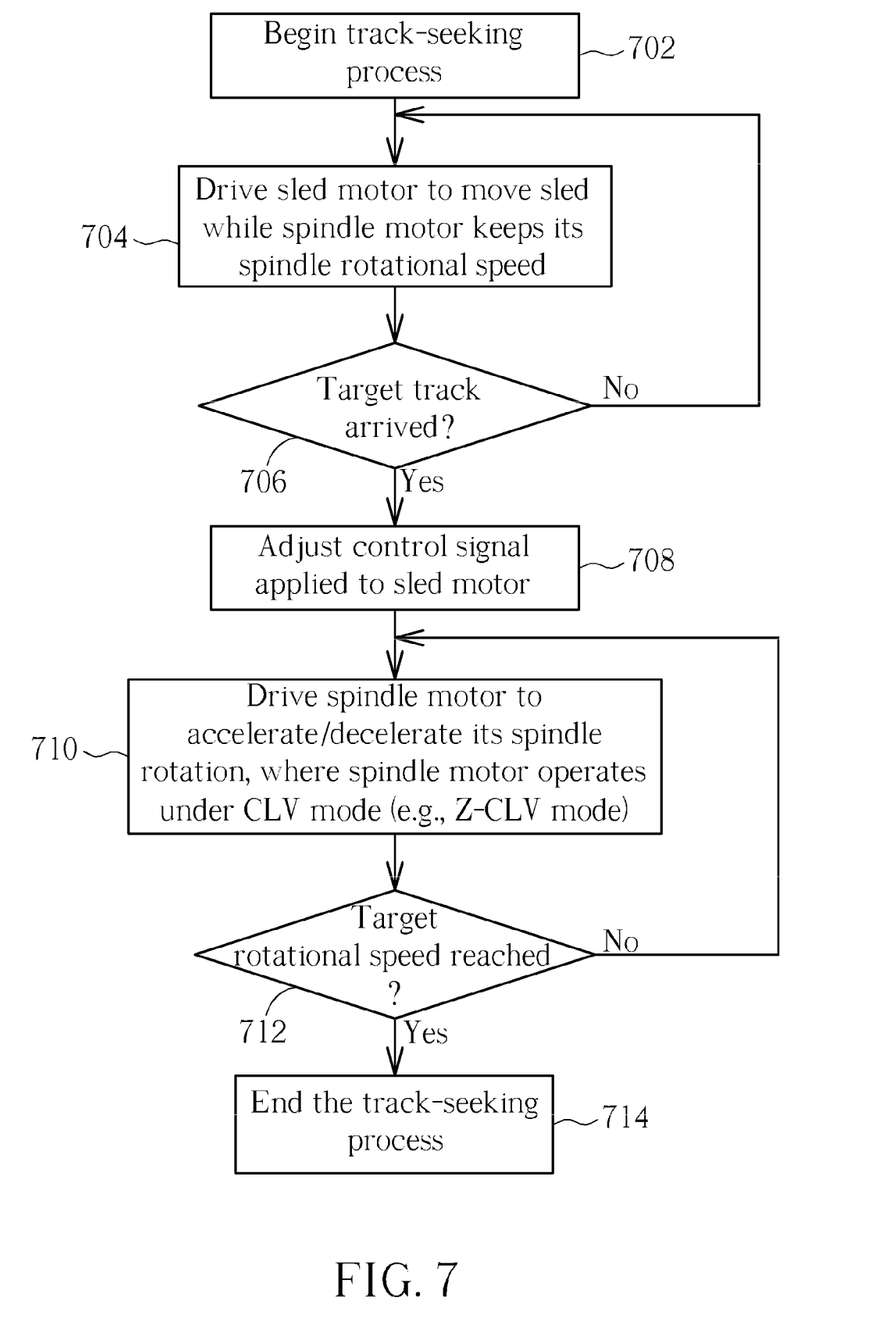
FIG. 7 is a flowchart illustrating an exemplary method of controlling the optical storage apparatus under a fourth operational scenario.

FIG. 7 is a flowchart illustrating an exemplary method of controlling the optical storage apparatus 100 under the fourth operational scenario. Provided that the result is substantially the same, the steps are not required to be executed in the exact order shown in FIG. 7. The exemplary method includes following steps.

Step 702: Begin a track-seeking process.

Step 704: Drive the sled motor 104 to move the sled 105 by applying a control signal S2 to the sled motor 104 while the spindle motor 102 keeps its spindle rotational speed.

Step 706: Check if the sled 105/OPU 103 has arrived at the target track. If yes, go to step 708; otherwise, go to step 704 to keep moving the sled 105 for seeking the target track.

Step 708: Adjust the control signal S2 applied to the sled motor 104. For example, as the sled motor controller 114 stops the control signal S2 from being applied to the sled motor 104, the resultant adjusted control signal S2' is kept at a predetermined voltage level or control level (e.g., "0") and thus has no control over the sled motor 104.

Step 710: Drive the spindle motor 102 to accelerate/decelerate its spindle rotation (i.e., to change the rotational speed of the optical storage medium 101) by applying a control signal S1 to the spindle motor 102 which operates under the CLV mode.

Step 712: Check if the rotational speed has reached the target speed. If yes, go to step 714; otherwise, go to step 710 to keep changing the rotational speed of the optical storage medium 101.

Step 714: End the track-seeking process.

Figure 8:
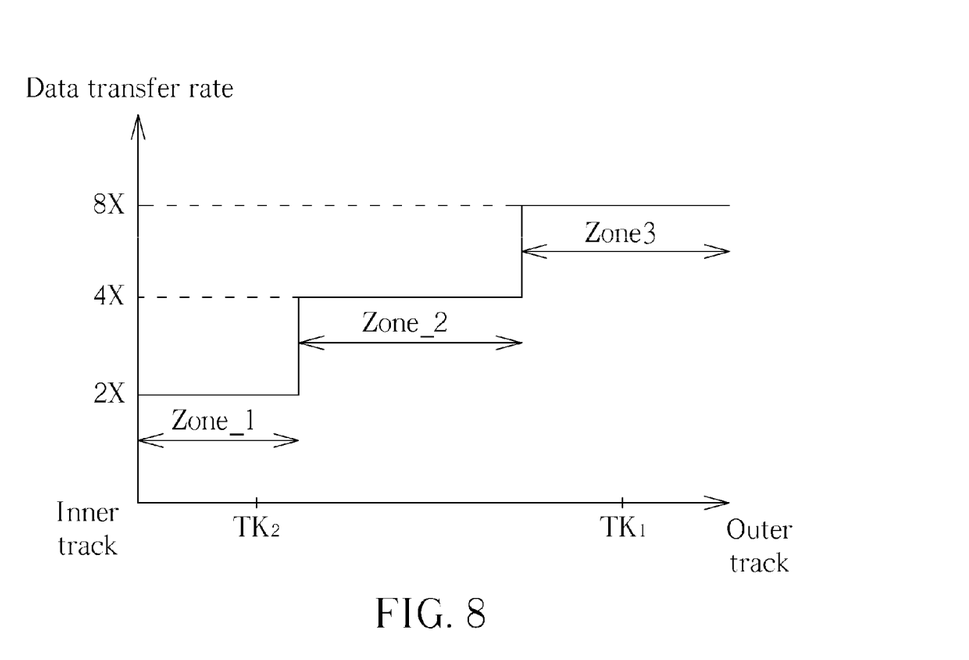
FIG. 8 is a diagram illustrating the relationship between the data transfer rate and the track position.
Figure 9:
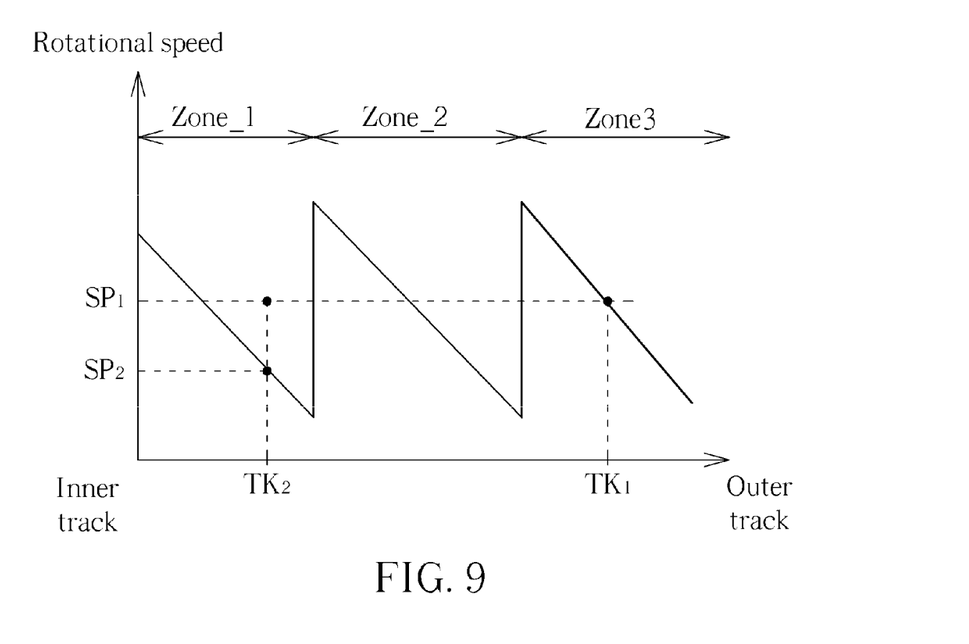
FIG. 9 is a diagram illustrating the relationship between the rotational speed and the track position.

Please refer to FIG. 7 in conjunction with FIG. 8 and FIG. 9. FIG. 8 is a diagram illustrating the relationship between the data transfer rate and the track position. FIG. 9 is a diagram illustrating the relationship between the rotational speed and the track position. Suppose that the spindle motor 102 is arranged to operate under a Z-CLV mode. Therefore, the optical storage medium 101, such as an optical disc, is divided into a plurality of ring-shaped zones. As shown in FIG. 8, the inner zone Zone_1 is accessed using a lower data transfer rate (i.e., 2×), the outer zone Zone_3 is accessed using a higher data transfer rate (i.e., 8×), and the middle zone Zone_2 is accessed using a medium data transfer rate (i.e., 4×). Suppose that the OPU 103 is currently located at the track $TK_1$ within the outer zone Zone_3, and the next track $TK_2$ to be accessed is located in the inner zone Zone_1. Thus, a track-seeking process should be enabled to seek the target track $TK_2$ (step 702). As there is a long distance from the current track $TK_1$ to the target track $TK_2$, the sled motor controller 114 therefore generates the control signal S2 to the sled motor 104 for moving the sled 105 on which the OPU 103 is disposed from the current track $TK_1$ to the target track $TK_2$ (steps 706 and 704). It should be noted that the rotational speed of the optical storage medium 101 is not changed while the sled motor 104 is moving the sled 105. That is, in this embodiment, the spindle motor 102 does not accelerate/decelerate its spindle rotational during the moving of the sled 105.

Therefore, as shown in FIG. 9, the rotational speed is maintained at $SP_1$ when the sled motor 104 is moving the sled 105. After the sled 105/OPU 103 has arrived at the target track $TK_2$, the sled motor 104 stops moving the sled 105 and the spindle motor 102 is driven by the spindle motor controller 112 to start accelerating/decelerating its spindle rotation for changing the rotational speed to the target speed $SP_2$ (steps 708, 710, and 712).

Regarding a fifth operational scenario, the above-mentioned first mechanical mechanism is the spindle motor 102 which is arranged to operate under a constant angular velocity (CAV) mode, and the above-mentioned second mechanical mechanism is the sled motor 104. When a track-seeking process is performed for making the OPU 103 jump to a target track, the sled motor 104 may be required to move the sled 105. If the sled motor 104 is enabled to move the sled 105 while the spindle motor 102 is operating for rotating the optical storage medium 101 at a desired constant angular velocity under the CAV mode, the current/power consumption may be too high. To solve this problem, the control signal S1 which drives the spindle motor 102 to maintain its spindle rotation at the desired constant angular velocity would be adjusted by the spindle motor controller 112 when the sled motor 104 is requested to be active for moving the sled 105. Please note that the adjusted control signal S1' may be set by reducing the control signal S1 applied to the spindle motor 102 such that the spindle motor 102 makes its spindle rotate with slower acceleration/deceleration, or may be set by stopping the control signal S1 from being applied to the spindle motor 102 such that the adjusted control signal S1' has no control over the spindle motor 102. Next, after the sled 105 is successfully moved by the sled motor 104, the spindle motor controller 112 restores the adjusted control signal S1' to the original control signal S1.

Figure 10:
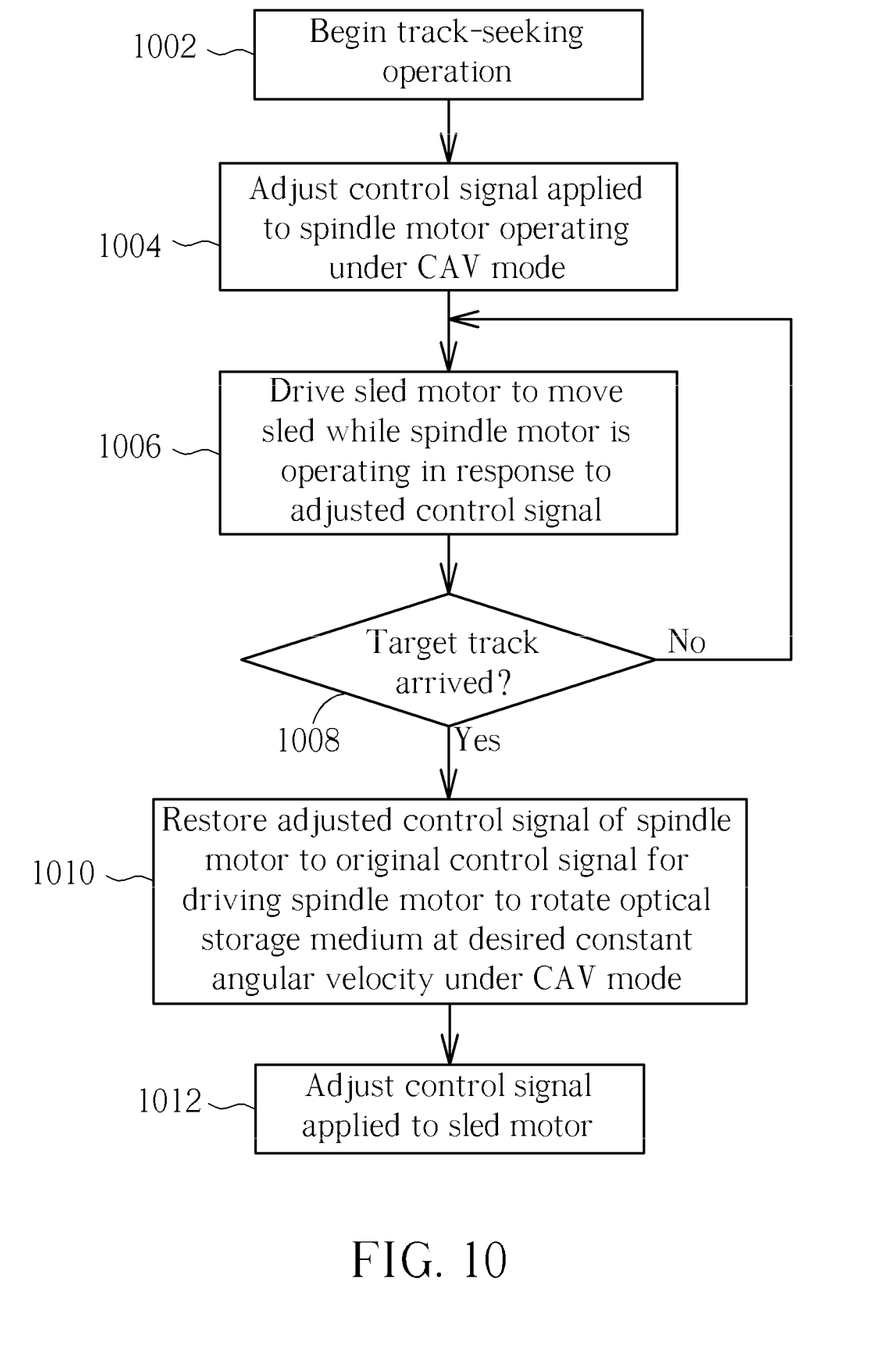
FIG. 10 is a flowchart illustrating an exemplary method of controlling the optical storage apparatus under a fifth operational scenario.

FIG. 10 is a flowchart illustrating an exemplary method of controlling the optical storage apparatus 100 under the fifth operational scenario. Provided that the result is substantially the same, the steps are not required to be executed in the exact order shown in FIG. 10. The exemplary method includes following steps.

Step 1002: Begin a track-seeking process.

Step 1004: Adjust the control signal S1 applied to the spindle motor 102 operating under the CAV mode.

Step 1006: Drive the sled motor 104 to move the sled 105 by applying a control signal S2 to the sled motor 104 while the spindle motor 102 is operating in response to the adjusted control signal S1'.

Step 1008: Check if the sled 105/OPU 103 has arrived at the target track. If yes, go to step 1010; otherwise, go to step 1006 to keep moving the sled 105 for seeking the target track.

Step 1010: Restore the adjusted control signal S1' to the original control signal S1 for driving the spindle motor 102 to rotate the optical storage medium 101 at the desired constant angular velocity under the CAV mode.

Step 1012: End the track-seeking process.

It should be noted that the spindle motor controller 112 may has a hold circuit (e.g., the hold circuit 408 shown in FIG. 4) for holding the original control signal (step 1004), and then restores the adjusted control signal to the original control signal after the sled motor controller 114 completes driving the sled motor 104 to move the sled 105 to the target track (step 1010).

Regarding the exemplary embodiment shown in FIG. 1, the spindle motor controller 112, the servo actuator controller 116, and the sled motor controller 114 may be implemented by pure hardware. That is, the adjustments made to the control signals S1, S2, and S3 are controlled by hardware elements. However, in an alternative design, the adjustments made to the control signals S1, S2, and S3 may be controlled by a processor executing a program code. Please refer to FIG. 11, which is a diagram illustrating an optical storage apparatus according to another exemplary embodiment of the present invention. The exemplary optical storage apparatus 1100 includes, but is not limited to, a plurality of mechanical mechanisms (e.g., the aforementioned spindle motor 102, sled motor 104, and servo actuator 106), a processor 1102, and a non-transitory machine-readable medium 1104 having a program code (e.g., firmware FW of the optical storage apparatus 1100) stored therein. By way of example, but not limitation, the machine-readable medium 1104 may be a non-volatile storage device such as a flash memory. When loaded and executed by the processor 1102, the firmware FW causes the processor 1102 to properly adjust the control signal S1/S2/S3, thereby preventing the overall current/power consumption of the optical storage apparatus 1100 from exceeding the acceptable level.

Figure 11:
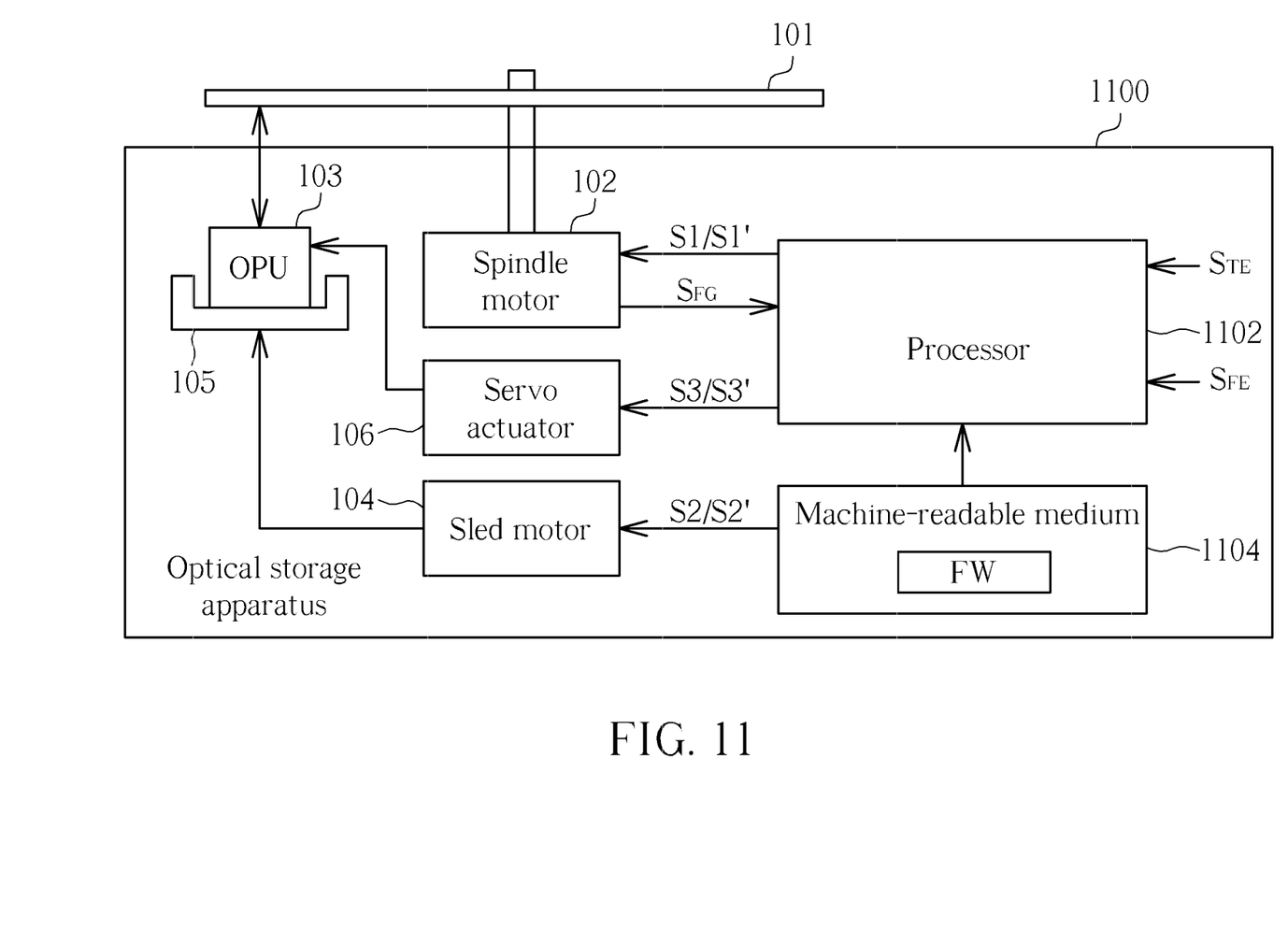
FIG. 11 is a diagram illustrating an optical storage apparatus according to another exemplary embodiment of the present invention.

Specifically, the firmware FW executed by the processor 1102 functions as the control module 110 shown in FIG. 1. Thus, the program code (e.g., firmware FW of the optical storage apparatus 1100), when executed by the processor 1102, would cause the processor 1102 to perform following steps for peak power/current reduction: driving a first mechanical mechanism (e.g., one of the spindle motor 102, the sled motor 104, and the servo actuator 106) by applying a first control signal (e.g., one of the control signals S1, S2, and S3) to the first mechanical mechanism, wherein a second mechanical mechanism (e.g., another of the spindle motor 102, the sled motor 104, and the servo actuator 106) is inactive while the first mechanical mechanism is operating in response to the first control signal; adjusting the first control signal applied to the first mechanical mechanism when the second mechanical mechanism is requested to be active; and driving the second mechanical mechanism by applying a second control signal (e.g., another of the control signals S1, S2, and S3) to the second mechanical mechanism while the first mechanical mechanism is operating in response to the adjusted first control signal (e.g., one of the adjusted control signal S1', S2', and S3').

In this firmware-based implementation, adjusting the first control signal applied to the first mechanical mechanism is accomplished by setting the adjusted first control through stopping the first control signal from being applied to the first mechanical mechanism. As a person skilled in the art can readily understand the operation of the program code (e.g., firmware FW of the optical storage apparatus 1100) executed by the processor 1102 after reading above paragraphs directed to different operational scenarios of the exemplary optical storage apparatus 100 shown in FIG. 1, further description is omitted here for brevity.

It should be noted that the aforementioned mechanical mechanisms, such as the spindle motor 102, the sled motor 104, and the servo actuator 106 shown in FIG. 1 and FIG. 11, are for illustrative purposes only. Any optical storage apparatus employing the proposed method to control mechanical mechanisms included therein for peak power/current reduction obeys the spirit of the present invention and falls within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling an optical storage apparatus which has a plurality of mechanical mechanisms including at least a first mechanical mechanism and a second mechanical mechanism, the method comprising:
    driving the first mechanical mechanism by applying a first control signal to the first mechanical mechanism, wherein the second mechanical mechanism is inactive while the first mechanical mechanism is operating in response to the first control signal;
    adjusting the first control signal applied to the first mechanical mechanism when the second mechanical mechanism is requested to be active, wherein the first control signal applied to the first mechanical mechanism is adjusted each time the second mechanical mechanism is requested to be active; and
    driving the second mechanical mechanism by applying a second control signal to the second mechanical mechanism while the first mechanical mechanism is operating in response to the adjusted first control signal.

2. The method of claim 1, wherein the step of adjusting the first control signal applied to the first mechanical mechanism comprises:
    reducing the first control signal and accordingly generating the adjusted first control signal to control the first mechanical mechanism.

3. The method of claim 1, wherein the step of adjusting the first control signal applied to the first mechanical mechanism comprises:
    setting the adjusted first control by stopping the first control signal from being applied to the first mechanical mechanism such that the adjusted first control signal has no control over the first mechanical mechanism.

4. The method of claim 1, wherein the first mechanical mechanism is a spindle motor, and the second mechanical mechanism is a sled motor.

5. The method of claim 4, wherein the step of driving the first mechanical mechanism by applying the first control signal to the first mechanical mechanism comprises:
    driving the spindle motor to accelerate/decelerate its spindle rotation by applying the first control signal to the spindle motor.

6. The method of claim 4, wherein the step of adjusting the first control signal applied to the first mechanical mechanism comprises:
    when the sled motor is requested to be active during a track-following process, adjusting the first control signal applied to the spindle motor.

7. The method of claim 4, wherein the step of adjusting the first control signal applied to the first mechanical mechanism comprises:
    when the sled motor is requested to be active during a track-seeking process, adjusting the first control signal applied to the spindle motor operating under a constant angular velocity (CAV) mode.

8. The method of claim 1, wherein the first mechanical mechanism is a spindle motor, and the second mechanical mechanism is a servo actuator.

9. The method of claim 8, wherein the step of adjusting the first control signal applied to the first mechanical mechanism comprises:
    when the servo actuator is requested to be active during a track-on process, adjusting the first control signal applied to the spindle motor.

10. The method of claim 1, wherein the first mechanical mechanism is a sled motor, and the second mechanical mechanism is a servo actuator.

11. The method of claim 10, wherein the step of adjusting the first control signal applied to the first mechanical mechanism comprises:
    when the servo actuator is requested to be active during a track-on process, adjusting the first control signal applied to the sled motor.

12. The method of claim 1, wherein the first mechanical mechanism is a servo actuator, and the second mechanical mechanism is a sled motor.

13. The method of claim 12, wherein the step of adjusting the first control signal applied to the first mechanical mechanism comprises:
    when the sled motor is requested to be active during a track-following process, adjusting the first control signal applied to the servo actuator.

14. The method of claim 12, wherein the step of adjusting the first control signal applied to the first mechanical mechanism comprises:
    adjusting the first control signal by lowering an output gain applied to a servo control signal.

15. A method of controlling an optical storage apparatus which has a plurality of mechanical mechanisms including at least a first mechanical mechanism and a second mechanical mechanism, the method comprising:
    driving the first mechanical mechanism by applying a first control signal to the first mechanical mechanism, wherein the first mechanical mechanism is a sled motor, and the second mechanical mechanism is a spindle motor; and the second mechanical mechanism does not accelerate/decelerate its spindle rotation while the first mechanical mechanism is operating in response to the first control signal;
    adjusting the first control signal applied to the first mechanical mechanism when the second mechanical mechanism is requested to accelerate/decelerate its spindle rotation; and driving the second mechanical mechanism by applying a second control signal to the second mechanical mechanism while the first mechanical mechanism is operating in response to the adjusted first control signal.

16. The method of claim 15, wherein the spindle motor is arranged to operate under a constant linear velocity (CLV) mode, and the step of adjusting the first control signal applied to the first mechanical mechanism comprises:
when the spindle motor is requested to be active during a track-seeking process, adjusting the first control signal applied to the sled motor.

17. An optical storage apparatus, comprising:
a plurality of mechanical mechanisms, including at least a first mechanical mechanism and a second mechanical mechanism; and
a control module, electrically connected to at least the first mechanical mechanism and the second mechanical mechanism, comprising:
a first controller, arranged for driving the first mechanical mechanism by applying a first control signal to the first mechanical mechanism, wherein the second mechanical mechanism is inactive while the first mechanical mechanism is operating in response to the first control signal; and for adjusting the first control signal applied to the first mechanical mechanism when the second mechanical mechanism is requested to be active, wherein the first controller adjusts the first control signal applied to the first mechanical mechanism each time the second mechanical mechanism is requested to be active; and
a second controller, arranged for driving the second mechanical mechanism by applying a second control signal to the second mechanical mechanism while the first mechanical mechanism is operating in response to the adjusted first control signal.

18. The optical storage apparatus of claim 17, wherein the first controller reduces the first control signal and accordingly generating the adjusted first control signal to control the first mechanical mechanism.

19. The optical storage apparatus of claim 17, wherein the firs controller sets the adjusted first control by stopping the first control signal from being applied to the first mechanical mechanism such that the adjusted first control signal has no control over the first mechanical mechanism.

20. The optical storage apparatus of claim 17, wherein the first mechanical mechanism is a spindle motor, and the second mechanical mechanism is a sled motor.

21. The optical storage apparatus of claim 20, wherein the first controller drives the spindle motor to accelerate/decelerate its spindle rotation by applying the first control signal to the spindle motor.

22. The optical storage apparatus of claim 20, wherein when the sled motor is requested to be active during a track-following process, the first controller is operative to adjust the first control signal applied to the spindle motor.

23. The optical storage apparatus of claim 20, wherein when the sled motor is requested to be active during a track-seeking process, the first controller is operative to adjust the first control signal applied to the spindle motor operating under a constant angular velocity (CAV) mode.

24. The optical storage apparatus of claim 17, wherein the first mechanical mechanism is a spindle motor, and the second mechanical mechanism is a servo actuator.

25. The optical storage apparatus of claim 24, wherein when the servo actuator is requested to be active during a track-on process, the first controller is operative to adjust the first control signal applied to the spindle motor.

26. The optical storage apparatus of claim 17, wherein the first mechanical mechanism is a sled motor, and the second mechanical mechanism is a servo actuator.

27. The optical storage apparatus of claim 26, wherein when the servo actuator is requested to be active during a track-on process, the first controller is operative to adjust the first control signal applied to the sled motor.

28. The optical storage apparatus of claim 17, wherein the first mechanical mechanism is a servo actuator, and the second mechanical mechanism is a sled motor.

29. The optical storage apparatus of claim 28, wherein when the sled motor is requested to be active during a track-following process, the first controller is operative to adjust the first control signal applied to the servo actuator.

30. The optical storage apparatus of claim 28, wherein the first controller is arranged to adjust the first control signal by lowering an output gain applied to a servo control signal.

31. The optical storage apparatus of claim 17, being an external optical disc drive.

32. An optical storage apparatus, comprising:
a plurality of mechanical mechanisms, including at least a first mechanical mechanism and a second mechanical mechanism, wherein the first mechanical mechanism is a sled motor, and the second mechanical mechanism is a spindle motor; and
a control module, electrically connected to at least the first mechanical mechanism and the second mechanical mechanism, comprising:
a first controller, arranged for driving the first mechanical mechanism by applying a first control signal to the first mechanical mechanism, wherein the second mechanical mechanism does not accelerate/decelerate its spindle rotation while the first mechanical mechanism is operating in response to the first control signal; and for adjusting the first control signal applied to the first mechanical mechanism when the second mechanical mechanism is requested to accelerate/decelerate its spindle rotation; and
a second controller, arranged for driving the second mechanical mechanism by applying a second control signal to the second mechanical mechanism while the first mechanical mechanism is operating in response to the adjusted first control signal.

33. The optical storage apparatus of claim 32, wherein the spindle motor is arranged to operate under a constant linear velocity (CLV) mode; and when the spindle motor is requested to be active during a track-seeking process, the first controller is operative to adjust the first control signal applied to the sled motor.

34. A machine-readable medium, storing a program code, when executed by a processor, causing the processor to perform following steps:
driving a first mechanical mechanism of an optical storage apparatus by applying a first control signal to the first mechanical mechanism, wherein a second mechanical mechanism of the optical storage apparatus is inactive while the first mechanical mechanism is operating in response to the first control signal;
adjusting the first control signal applied to the first mechanical mechanism when the second mechanical mechanism is requested to be active, wherein the first control signal applied to the first mechanical mechanism is adjusted each time the second mechanical mechanism is requested to be active; and
driving the second mechanical mechanism by applying a second control signal to the second mechanical mechanism while the first mechanical mechanism is operating in response to the adjusted first control signal.

* * * * *